United States Patent [19]

Gergen et al.

[11] Patent Number: 5,071,916
[45] Date of Patent: Dec. 10, 1991

[54] BLENDS OF LINEAR ALTERNATING POLYKETONES AND PARTIALLY NEUTRALIZED ACIDIC POLYMERS

[75] Inventors: William P. Gergen, Houston, Tex.; Robert G. Lutz, Santa Rosa, Calif.

[73] Assignee: Shell Oil Company, Houston, Tex.

[21] Appl. No.: 338,701

[22] Filed: Apr. 17, 1989

[51] Int. Cl.$^5$ ............ C08L 23/08; C08L 33/02; C08L 101/06
[52] U.S. Cl. ............ 525/185; 524/502; 525/539; 525/919
[58] Field of Search ............ 525/185, 539, 919; 524/502

[56] References Cited

U.S. PATENT DOCUMENTS

| | | | |
|---|---|---|---|
| 2,264,272 | 8/1966 | Rees | 260/78.5 |
| 2,495,286 | 1/1950 | Brubaker | 260/63 |
| 3,404,134 | 10/1968 | Rees | 260/78.5 |
| 3,964,412 | 9/1972 | Nozaki | 260/63 |
| 4,078,014 | 3/1978 | Starkweather, Jr. et al. | 525/179 |
| 4,387,188 | 6/1983 | Statz | 525/78 |
| 4,783,494 | 11/1988 | Allen | 525/67 |
| 4,870,133 | 9/1989 | Lutz et al. | 525/185 |
| 4,874,801 | 10/1989 | George et al. | 524/502 |
| 4,874,819 | 10/1989 | George et al. | 524/502 |
| 4,956,412 | 9/1990 | Gergen et al. | 525/185 |

FOREIGN PATENT DOCUMENTS

| | | |
|---|---|---|
| 121965 | 3/1984 | European Pat. Off. . |
| 181014 | 9/1985 | European Pat. Off. . |
| 1081304 | 2/1966 | United Kingdom . |

*Primary Examiner*—John C. Bleutge
*Assistant Examiner*—Thomas Hamilton, III

[57] ABSTRACT

Blends of (a) a linear alternating polymer of carbon monoxide and at least one ethylenically unsaturated hydrocarbon with (b) a partial non-alkali metal salt of a polymer of an α-olefin, an unsaturated carboxylic acid, and optionally a third monomer, exhibit improved properties of processability and toughness.

13 Claims, No Drawings 5,071,916

BLENDS OF LINEAR ALTERNATING POLYKETONES AND PARTIALLY NEUTRALIZED ACIDIC POLYMERS

FIELD OF THE INVENTION

This invention relates to an improved polymer blend comprising predominantly a linear alternating polymer of carbon monoxide and at least one ethyleneically unsaturated hydrocarbon. More particularly, the invention relates to blends of the linear alternating polymer with a partial non-alkali metal salt of an α-olefin/unsaturated carboxylic acid polymer.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, i.e., peroxy compounds. G.B. 1,081,304 produced similar polymers of higher carbon monoxide content in the in the presence of alkylphosphine complexes of palladium salts as catalyst. Nozaki extended this process to produce linear alternating polymers by the use of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon, e.g., ethylene or ethylene and propylene, has become of greater interest in part because of the greater availability of the polymers. These polymers, often referred to as polyketones or polyketone polymers, have been shown to be of the repeating formula —CO—(A)— where A is the moiety of unsaturated hydrocarbon polymerized through the ethylenic unsaturation. For example, when the hydrocarbon is ethylene the polymer is represented by the repeating formula —CO—(CH$_2$—CH$_2$)—. The general process for the more recent product of such polymers is illustrated by a number of published European Patent Applications including 0,121,965 and 0,181,014. The process typically involves a catalyst composition formed from a compound of a Group VIII metal selected from palladium, cobalt and nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for the food and drink industry and internal and external parts for the automotive industry which are produced by processing the polymer according to known methods. For some particular applications it has been found desirable to have properties for a polymeric composition which are somewhat different from those of the polyketone polymers. It would be of advantage to retain the desirable properties of the polyketone polymers and yet improve other properties. These advantages are often obtained through the provision of a polymer blend.

SUMMARY OF THE INVENTION

The present invention includes blends of linear alternating polymers of carbon monoxide and at least one ethylenically unsaturated hydrocarbon and certain other polymeric materials. More particularly, according to the invention, there are provided blends of a linear alternating polymer with a partial non-alkali metal salt of a polymer of an α-olefin and an ethylenically unsaturated carboxylic acid. Such blends exhibit improved processability and impact resistance as compared to the unblended linear alternating polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, butylene, isobutylene, 1-hexene, 1-octene and 1-dodecene, or are arylaliphatic containing an aromatic substitutent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or are terpolymers of carbon monoxide, ethylene and a second hydrocarbon of at least 3 carbon atoms, particularly an α-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of unsaturated hydrocarbon. When terpolymers of carbon monoxide, ethylene and a second hydrocarbon are employed in the blends of the invention, there will be within the terpolymer at least two units incorporating a moiety of ethylene for each unit incorporating a moiety of second hydrocarbon, preferably from about 10 units to about 100 units incorporating a moiety of ethylene per unit incorporating a moiety of the second hydrocarbon. The polymer chain is therefore represented by the formula

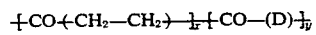

where D is the moiety obtained by polymerization of the second hydrocarbon through the ethylenic unsaturation. The —CO—(CH$_2$—CH$_2$— units and the —CO—(D)— units are found randomly throughout the polymer chain and the ratio of y:x is no more than about 0.5:1. In the modification of the invention where copolymer of carbon monoxide and ethylene is employed as a blend component there will be no second hydrocarbon and the polyketone polymer is represented by the above formula wherein y=0. When y is other than 0, i.e., terpolymers are employed, ratios of y:x from about 0.01:1 to about 0.1:1 are preferred. The end groups or "caps" of the polymer chain will depend on what materials are present during the production of the polyketone and whether and how the polyketone is purified. The precise properties of the polymer will not depend upon the particular end groups to any considerable extent so that the polymer is fairly represented by the above formula for the polymeric chain. Of particular interest are the polyketones of molecular weight from about 1,000 to about 200,000, particularly those of a number average molecular weight from about 20,000 to about 90,000 as determined by gel permeation chmotography. The physical properties of such polymers will depend in part upon the molecular weight of the polymer, whether the polyketone polymer is a copolymer or a terpolymer and the relative proportion of second hydrocarbon present in the case of the terpolymers. Typical melting points of such polymers are from about 175° C. to about 300° C., more frequently from about 210° C. to about 270° C. The polymers will have a limiting viscosity number (LVN), measured in a standard capillary viscosity measuring device in m-cresol at 60° C., from about 0.5 to about 10, preferably from about 0.8 to about 4.

A method of producing the polyketone polymers which is now becoming conventional is to contact the carbon monoxide and unsaturated hydrocarbon(s) in the presence of a catlyst composition formed from a palladium compound, the anion of a non-hydrohalogenic acid having a pKa below about 6 and a bidentate phosphorus ligand. Such a process for polyketone production is illustrated by copending U.S. patent application Ser. No. 930,468, filed Nov. 14, 1986 now abandoned. The scope of the process of polyketone production is extensive, but without wishing to be limited, a preferred palladium compound is a palladium carboxylate, particularly palladium acetate, the preferred anion is the anion of trifluoracetic acid or p-toluenesulfonic acid and the preferred bidentate ligand is 1,3-bis(diphenylphosphino)propane or 1,3-bis[di(2-methoxyphenyl)phosphino]propane.

Polymerization is conducted in a gas phase or in a liquid phase in the presence of an inert liquid diluent such as methanol or ethanol. The reactants are contacted under polymerization conditions in the presence of the catalyst composition by conventional methods such as shaking or stirring in a reaction vessel. Suitable reaction temperatures are from about 20° C. to about 150° C. with preferred reaction temperatures being from about 50° C. to about 135° C. Typical reaction pressures are from about 1 bar to about 200 bar, more typically from about 10 bar to about 100 bar. Subsequent to reaction the polymer is recovered as by decantation or filtration. The polymer product may contain residues of the catalyst composition which are removed, if desired, by treatment of the polymer product with a solvent or complexing agent which is selective for the residues.

The minor component of the blends of the invention is a partial non-alkali metal salt of an α-olefin/unsaturated carboxylic acid polymer optionally containing a small proportion of a third monomer. By the term partial non-alkali metal salt is meant that some but not all of the carboxylic acid moieties have been neutralized with zinc, aluminum, or magnesium as further discussed below. Because the partially neutralized material retains ionic character while being polymeric in form, the material is often referred to as a metal ionomer.

The α-olefin component of the partially neutralized zinc ionomer is an α-olefin of up to 10 carbon atoms inclusive such as ethylene, propylene, 1-butene, 1-octene and 1-decene. Preferred α-olefins are straight chain α-olefins of up to 4 carbon atoms inclusive and particularly preferred is ethylene. The α-olefin component of the partially neutralized polymer is present in at least 80% by mol, based on the total base polymer, i.e., the non-neutralized polymer, and preferably present in at least 90% by mol on the same basis.

The unsaturated carboxylic acid component of the partially neutralized polymer is preferably an α, β-ethylenically unsaturated carboxylic acid of up to 10 carbon atoms inclusive and is illustrated by acrylic acid, 2-hexenoic acid, 2-octenoic acid and 2-decenoic acid. The preferred α, β-ethylenically unsaturated carboxylic acids have up to 4 carbon atoms inclusive. These are acrylic acid, methacrylic acid and crotonic acid, of which, methacrylic acid is preferred. The unsaturated carboxylic acid content of the partially neutralized polymer component of the blends is from about 1% by mol to about 20% by mol based on the base or non-neutralized polymer. Amounts of carboxylic acid from about 9% by mol to about 15% by mol on the same basis are preferred.

The partially neutralized polymer is suitably a copolymer of the α-olefin and the α, β-unsaturated carboxylic acid and in general such copolymers are preferred. On occasion, however, it is useful to include as an optional component a third monomer which is a non-acidic low molecular weight polymerizable monomer of up to 8 carbon atoms inclusive. Such optional third components of the partially neutralized polymer may be other olefins, particularly other α-olefins such as propylene or styrene when the major α-olefin component of the partially neutralized polymer is ethylene, unsaturated esters such as vinyl acetate, methyl methacrylate and butyl acrylate, unsaturated halohydrocarbons such as vinyl chloride and vinyl fluoride and unsaturated nitriles such as acrylonitrile. As previously stated, the presence of a polymerizable third component within the partially neutralized polymer is optional and no third component is required. When a third component is present, however, amounts of third component up to about 5% by mol, based on the non-neutralized or base polymer are satisfactory with amounts of up to about 3% by mol on the same basis being preferred.

The partially neutralized polymer, i.e., the metal ionomer, is produced by reacting the α-olefin/unsaturated carboxylic acid/optional third component polymer with a source of the ionizable metal compound sufficient to neutralize from about 10% to about 90% of the carboxylic acid groups present in the polymer. Such neutralization with ionizable zinc, the preferred metal compound, results in a uniform distribution of zinc throuhout the polymer. Neutralization of from about 20% to about 80% of the carboxylic acid groups is preferred and neutralization of from about 35% to about 75% of the carboxylic acid groups is particularly preferred. The metal ions suitably employed in the partial neutralization are uncomplexed non-alkali metal ions including zinc ions, aluminum ions, and magnesium ions which are provided in compounds of the type often referred to as metal salts, e.g., zinc chloride, zinc acetate and zinc formate, or are complexed metal ions wherein the metal is bonded to two types of groups, at least one of which is readily ionized from the metal and the other is not. Illustrative of such complexed metal ions are mixed zinc salts with one weak acid such as oleic acid or stearic acid and one more ionizable acid such as acetic acid or formic acid. In general, neutralization with a complexed zinc ion is most preferred.

Methods of producing the metal ionomers are known in the art and are disclosed in U.S. Pat. No. 3,264,272 and U.S. Pat. No. 3,404,134 which are incorporated herein by reference. Certain of these partially neutralized polymers, i.e., the metal ionomers, are commercially available and are marketed under the trademark SURLYN by DuPont.

The blends of the invention comprise a mixture of a major proportion of the polyketone polymer and a minor proportion of the partially neutralized polymer. The precise percentage of the partially neutralized polymer to be employed in the blend is not critical and amounts of partially neutralized polymer from about 0.1% by weight to about 35% by weight, based on the total blend, are satisfactory. Amounts of partially neutralized polymer from 1% by weight to about 10% by weight on the same basis are preferred and amounts from about 3% by weight to about 7% by weight on the same basis are particularly preferred.

The method of producing the blend of the polyketone polymer and the partially neutralized polymer is not material as long as a relatively uniform distribution of the partially neutralized polymer throughout the polyketone is obtained. The polyketone/partially neutralized polymer blend is a non-miscible blend with the partially neutralized polymer existing as a discrete phase in the polyketone matrix having a phase size of from about 0.2 micron to about 2 microns, more typically on the order of 0.5 microns. The blend will therefore not be homogeneous, but the distribution of the partially neutralized polymer phase throughout the polyketone polymer matrix will be substantially uniform. The method of blending the components is that which is conventional for non-miscible polymeric materials. The materials are extruded in one modification employing a co-rotating twin screw extruder at a high RPM. In an alternate modification the components are blended in a mixing device which exhibits high shear.

The blends of the invention may also include conventional additives such as antioxidants, stabilizers, fillers, fire resistant materials, mold release agents and other substances which are added to increase the processability of the polymer or modify the properties of the resulting blend. Such additives are added by conventional methods prior to, together with, or subsequent to the blending of the polyketone and partially neutralized polymer components.

The blends of the invention are characterized by improved processability and impact resistance when compared to the polyketone polymer, in part because of the good interfacial adhesion between the dispersed partially neutralized polymer phase and the polyketone matrix. The blends are of particular utility where production of articles by processes involving molten polymer are employed or where molded parts are desired which require toughness and impact resistance when exposed to elevated temperatures. The blends are processed by means of the usual techniques, such as injection molding, into sheets, plates, films and shaped articles. Illustrative of such applications are the production of internal as well as external parts for automotive application and structural parts for utilization in the construction industry.

The invention is further illustrated by the following Illustrative Embodiments which should not be construed as limiting the invention.

COMPARATIVE EXAMPLE I

A linear alternating terpolymer of carbon monoxide, ethylene and propylene was produced in the presence of a catalyst composition formed from palladium acetate, the anion of trifluoroacetic acid and 1,3-bis[di(2)-methoxyphenyl)phosphino]propane. The melting point of the polymer was 224° C. and the polymer had a limiting viscosity number (LVN) of 1.61 when measured in m-cresol at 60° C. A small amount of IR-GANOX 1076, a conventional hindered phenolic antioxidant, was added as a stabilizer.

The terpolymer was extruded in a twin screw Baker Perkins extruder at 271° C. and 200 rpm then injection molded at 240° C. for measurement of impact strength. The molded sample had a notched Izod impact strength of 2.6 ft. lbs/in and other properties as shown in Table I.

COMPARATIVE EXAMPLE II

A molded sample of the polyketone polymer of Comparative Example I was produced with the same procedure as described in Comparative Example I except that 0.5% by weight of ETHANOX 330 was added as an antioxidant. The molded sample had a notched Izod impact strength of 2.8 ft. lbs/in and other properties as shown in Table I.

TABLE I

| | TENSILE PROPERTIES | | |
|---|---|---|---|
| | Tangent Mod psi | Tensile Max psi | Tensile Break psi |
| Comparative Example I | 199,000 | 9000 | 475 |
| Comparative Example II | 210,000 | 9100 | 417 |
| Illustrative Embod. I | 206,000 | 8900 | 467 |
| Illustrative Embod. II | 205,000 | 8500 | 452 |
| Illustrative Embod. III | 208,000 | 8800 | 468 |
| Illustrative Embod. IV | 202,000 | 8600 | 479 |
| Illustrative Embod. V | 195,000 | 8000 | 480 |

ILLUSTRATIVE EMBODIMENT I

A molded sample of a blend of the polyketone polymer of Comparative Example I and 0.2% by weight (based on total blend) of DuPont's SURLYN 9520, on α-olefin/unsaturated carboxylic acid polymer that is about 71% neutralized with zinc, was produced with the same procedure as described for Comparative Example II. The polymer blend exhibited slightly better processability in comparison to the polymer of Comparative Example II. The molded sample had a notched Izod impact strength of 2.6 ft. lbs/in and other properties as shown in Table I.

ILLUSTRATIVE EMBODIMENT II

A molded sample of a blend of the polyketone polymer of Comparative Example I and 0.5% by weight (based on total blend) of DuPont's SURLYN 9520 was produced with the same procedure as described for Comparative Example II. The polymer blend exhibited better melt strength and processability in comparison to the polymer of Comparative Example II. The molded sample had a notched Izod impact strength of 2.5 ft. lbs/in and other properties as shown in Table I.

ILLUSTRATIVE EMBODIMENT III

A molded sample of a blend of the polyketone polymer of Comparative Example I and 1.0% by weight (based on total blend) of DuPont's SURLYN 9520 was produced with the same procedure as described for Comparative Example II. The polymer blend exhibited good melt strength and better processability in comparison to the polymer of Comparative Example II. The molded sample had a notched Izod impact strength of 2.8 ft. lbs/in and other properties as shown in Table I.

ILLUSTRATIVE EMBODIMENT IV

A molded sample of a blend of the polyketone polymer of Comparative Example I and 2.0% by weight (based on total blend) of DuPont's SURLYN 9520 was produced with the same procedure as described for Comparative Example II. The polymer blend exhibited good melt strength and better processability in comparison to the polymer of Comparative Example II. The molded sample had a notched Izod impact strength of 2.8 ft. lbs/in and other properties as shown in Table I.

ILLUSTRATIVE EMBODIMENT V

A molded sample of a blend of the polyketone polymer of Comparative Example I and 5.0% by weight (based on total blend) of DuPont's SURLYN 9520 was produced with the same procedure as described for Comparative Example II. The polymer blend exhibited good melt strength and better processability in comparison to the polymer of Comparative Example II. The molded sample had a notched Iaod impact strength of 3.0 ft. lbs/in and other properties as shown in Table I.

COMPARATIVE EXAMPLE III

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 220° C. and the polymer had a limiting viscosity number (LVN) of 1.29 when measured in m-cresol at 60° C. Small amounts of IRGANOX 1076 and IONOL, conventional hindered phenolic antioxidants, were added for stabilization.

The terpolymer was extruded in a twin screw 30 mm Haake extruder at 240° C. and 200 rpm under a nitrogen blanket with a residence time of 0.5 minutes, then injection molded for measurement of properties. The molded sample had notched Izod impact strengths of 1.8 ft. lb/in at room temperature and 0.9 ft. lb/in at −20° C.

ILLUSTRATIVE EMBODIMENT VI

A molded sample of a blend of the polyketone polymer of Comparative Example III and 10% by weight (based on total blend) of DuPont's SURLYN 9520 was produced with the same procedure as described in Comparative Example III except that 0.3% by weight of ETHANOX 330 was added as an antioxidant. The molded sample had notched Izod impact strengths of 2.8 ft. lb/in at room temperature and 1.5 ft. lb/in at −20° C.

COMPARATIVE EXAMPLE IV

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 220° C. and the polymer had a limiting viscosity number (LVN) of 1.96 when measured in m-cresol at 60° C. A small amount of IRGANOX 1076 and IONOL, conventional hindered phenolic antioxidants, were added as stabilizers.

The terpolymer was extruded in a twin screw 30 mm Haake extruder at 280° C. and 200 rpm then injection molded for measurement of impact strength. The molded samples had a room temperature notched Izod impact strength of about 3.6 ft. lb/in.

COMPARATIVE EXAMPLE V

Molded samples of the polyketone polymer of Comparative Example IV were produced with the same procedure as described in Comparative Example IV except that 0.5% by weight of ETHANOX 330 was added as an antioxidant. The molded samples had notched Izod impact strengths of 4.6 and 5.8 ft. lbs/in.

ILLUSTRATIVE EMBODIMENT VII

Molded samples of a blend of the polyketone polymer of Comparative Example IV and 10% by weight (based on total blend) of DuPont's SURLYN 9520 were produced with the same procedure as described in Comparative Example V except that the extrusion temperature was 270° C. The polymer blend exhibited good melt strength in comparison to the polymer of Comparative Example V. The molded samples had notched Izod impact strengths of 3.2 and 3.4 lbs/in and were easy to mold.

COMPARATIVE EXAMPLE VI

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 220° C. and the polymer had a limiting viscosity number (LVN) of 1.78 when measured in m-cresol at 60° C. A small amount of IRGANOX 1076, a conventional hindered phenolic antioxidant, was added as a stabilizer.

The terpolymer was extruded in a twin screw Baker Perkins extruder at 271° C. and 300 rpm then injection molded at 275° C. for measurement of impact strength and other properties. The molded sample had a notched Izod impact strength of 4.5 ft. lbs/in and other properties as shown in Table II.

ILLUSTRATIVE EMBODIMENT VIII

A molded sample of a blend of the polyketone polymer of Comparative Example VI and 10% by weight (based on total blend) of DuPont's SURLYN 9520 was produced with the same procedure as described in Comparative Example VI except that 0.5% by weight of ETHANOX 330 was added as an antioxidant and the extrusion temperature was 275° C. The polymer blend exhibited good melt strength and better processability in comparison to the polymer of Comparative Example VI. The molded sample had a notched Izod impact strength of 3.9 ft. lbs/in and other properties as shown in Table II.

TABLE II

|  | Tan Mod psi | Stress, Max psi | % Strain @ Max Tensile | Stress, Brk psi | % Strain, Brk % (Range) |
|---|---|---|---|---|---|
| Comparative Example VI | 200,000 | 8,900 | 20 | 6,800 | 112 (51–154) |
| Illustrative Embod. VIII | 202,000 | 8,100 | 18 | 4,900 | 45 (18–54) |

What is claimed is:

1. A composition comprising a non-miscible blend of, as a major component, a linear alternating polymer of carbon monoxide and at least one ethylenically unsaturated hydrocarbon and, as a minor component, a partial non-alkali metal salt of a polymer of an α-olefin and an α,β-ethylenically unsaturated carboxylic acid.

2. The composition of claim 1 wherein the linear alternating polymer is represented by the formula

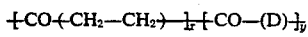

wherein D is the moiety of an ethylenically unsaturated hydrocarbon of at least 3 carbon atoms polymerized through the ethylenic unsaturation and the ratio of y:x is no more than about 0.5:1.

3. The composition of claim 2 wherein the minor component is a partially neutralized polymer of at least 80% α-olefin of up to 10 carbon atoms inclusive, from 1% by mol to 20% by mol, based on the polymer, of an α,β-ethylenically unsaturated carboxylic acid of up to 10 carbon atoms inclusive, and from 0 to 5% by mol, based on total polymer, of a non-acidic, low molecular weight polymerizable monomer.

4. The composition of claim 3 wherein from about 10% to about 90% of the original carboxyl groups of the partially neutralized polymer have been neutralized with ionizable zinc.

5. The composition of claim 4 wherein the ratio of y:x is from about 0.01:1 to about 0.1:1.

6. The composition of claim 3 wherein the minor component is a polymer of at least 80% by mol, based on total polymer, of ethylene, from about 1% to about 20% by mol, based on total polymer of methacrylic acid, from about 35% to about 75% of the carboxyl groups being neutralized with ionizable zinc.

7. The composition of claim 3 wherein the minor component is present in a quantity of from about 0.2% by weight to about 35% by weight, based on the total blend.

8. The composition of claim 7 wherein D is a moiety of propylene.

9. The composition of claim 7 wherein the minor component is present in an amount greater than 1% by weight of the composition.

10. A polymer composition produced by the process of
blending a linear alternating polymer of carbon monoxide and at least one ethylenically unsaturated hydrocarbon with a lesser amount of a polymer comprising a partial non-alkali metal salt of a polymer of an α-olefin and an α,β-ethylenically unsaturated carboxylic acid.

11. The polymer composition of claim 10 wherein the polyketone and the partial non-alkali metal salt are melt blended.

12. The polymeric composition of claim 10 wherein the bidentate ligand is 1,3-bispropane.

13. The polymer composition of claim 10 wherein the linear alternating polymer is produced in the presence of a catalyst composition comprising a palladium compound, an anion of a non-hydrohalogenic acid having a pKa below about 6, and a bidentate ligand of phosphorous.

* * * * *